United States Patent [19]

Beneteau

[11] 4,206,339

[45] Jun. 3, 1980

[54] AUTOMATIC WELDING APPARATUS HAVING A UNIFORMLY CONTROLLED LINEAL TORCH MOTION IN ONE DIRECTION

[76] Inventor: Donald J. Beneteau, 1333 Front Rd. South, Amherstburg, Ontario, Canada

[21] Appl. No.: 934,611

[22] Filed: Aug. 17, 1978

[51] Int. Cl.² ........................... B23K 9/12; B23K 5/24
[52] U.S. Cl. .................................... 219/125.1; 228/32
[58] Field of Search .................. 219/124.1, 125.1, 158; 228/5.7, 8, 25, 32

[56] References Cited

U.S. PATENT DOCUMENTS

| | | | |
|---|---|---|---|
| 2,782,488 | 2/1957 | Anderson | 228/5.7 |
| 4,014,495 | 3/1977 | Oda et al. | 219/125.1 X |
| 4,129,244 | 12/1978 | Morris | 228/5.7 X |

FOREIGN PATENT DOCUMENTS 47-14490  5/1972  Japan ............................................ 228/8

Primary Examiner—B. A. Reynolds
Assistant Examiner—Keith E. George

Attorney, Agent, or Firm—Allen D. Gutchess, Jr.

[57] ABSTRACT

Welding apparatus is provided for moving a welding tool in a controlled path at a controlled speed relative to a workpiece to produce a uniform weld bead. The apparatus includes a base carrying a workpiece support and a drive and control housing located behind the workpiece support. A welding tool mounting member is located under the drive and control housing and extends toward and over the workpiece support. A driven member in the drive and control housing is connected through a slot therein with the welding tool mounting member. The mounting member is guided by the driven member for movement in a linear path toward and away from the workpiece support to move a welding tool carried thereby back and forth over the workpiece support. Drive means moves the driven member and causes the mounting member to travel at a controlled, constant rate of movement toward said housing and away from the workpiece support. The mounting member has a handle to enable an operator to move the mounting member away from the housing back to a starting point over the workpiece support.

10 Claims, 8 Drawing Figures

AUTOMATIC WELDING APPARATUS HAVING A UNIFORMLY CONTROLLED LINEAL TORCH MOTION IN ONE DIRECTION

This invention relates to welding apparatus and particularly to apparatus for moving a welding tool in a controlled path at a controlled speed relative to a workpiece.

The new welding apparatus is adjustable to a variety of workpieces and weld lengths yet is relatively low in cost and low in maintenance, as compared to many welding machines now on the market. The new welding apparatus includes a base having a workpiece support carried thereby and a drive and control housing on the base behind the workpiece support. A welding tool mounting member is slidably mounted below the drive and control housing and is movable back and forth over the workpiece support, toward and away from the housing. The mounting member is connected through a slot in the bottom of the housing to a driven member therein, with the driven member being guided and supported within the housing on a path which is parallel to that of the welding tool mounting member.

A drive mechanism connected with the driven member drives the driven member and the welding tool mounting member in a lineal path having a direction such that the welding tool mounting member moves away from the workpiece support and toward the drive and control housing. The drive mechanism has a one-way clutch arrangement which enables an operator to grasp the mounting member and move it back to a starting point over the workpiece support in a direction opposite to the direction the mounting member is moved by the drive mechanism.

Switches in the drive and control housing control the starting and stopping of the drive mechanism to determine the position and length of the path of the mounting member. Other switches in the housing control the feed of weld wire to the welding tools and also control the flow of any shielding gas to the welding tools.

It is, therefore, a principal object of the invention to provide welding apparatus for moving a welding tool in a controlled path and at a controlled speed relative to a workpiece.

Another object of the invention is to provide apparatus for semi-automatically applying uniform welding beads to workpieces.

A further object of the invention is to provide welding apparatus for applying uniform beads to workpieces, which apparatus is relatively low in cost and low in maintenance requirements.

Many other objects and advantages of the invention will be apparent from the following detailed description of a preferred embodiment thereof, reference being made to the accompanying drawings, in which.

Figure 1:
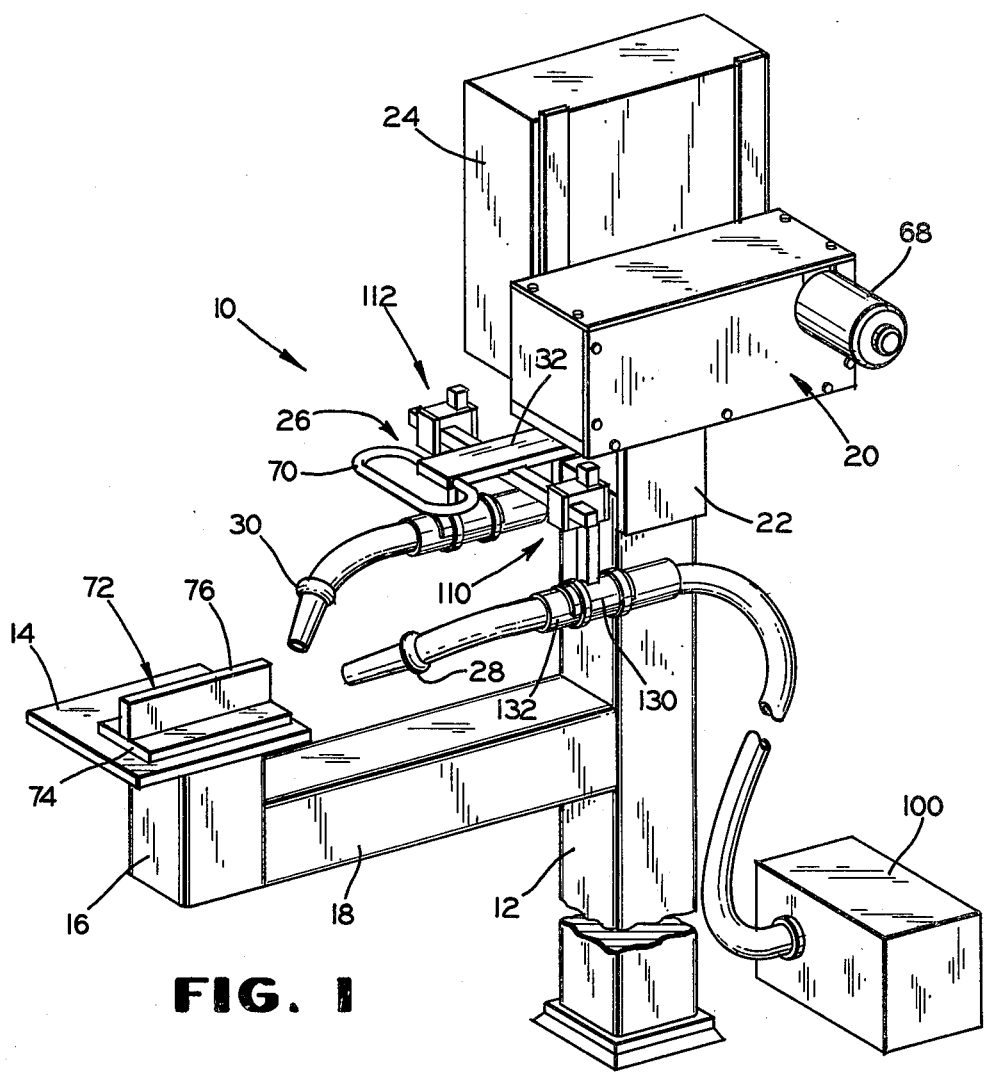
FIG. 1 is an overall view in perspective of a welding machine embodying the invention.
Figure 2:
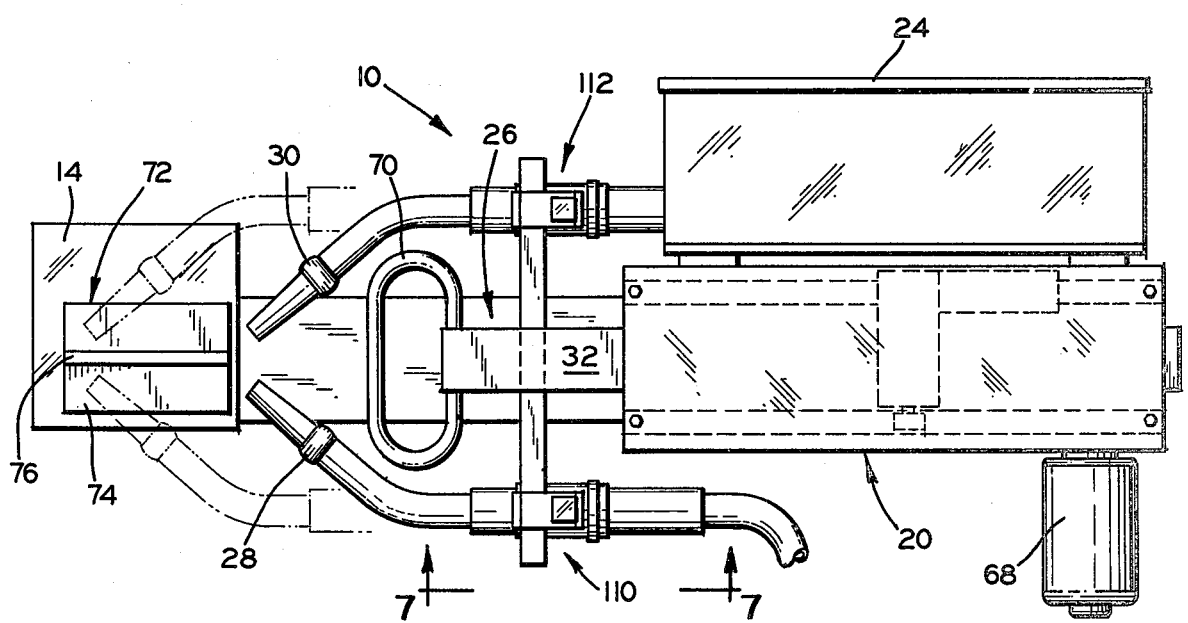
FIG. 2 is an enlarged, top view of the machine of FIG. 1.
Figure 3:
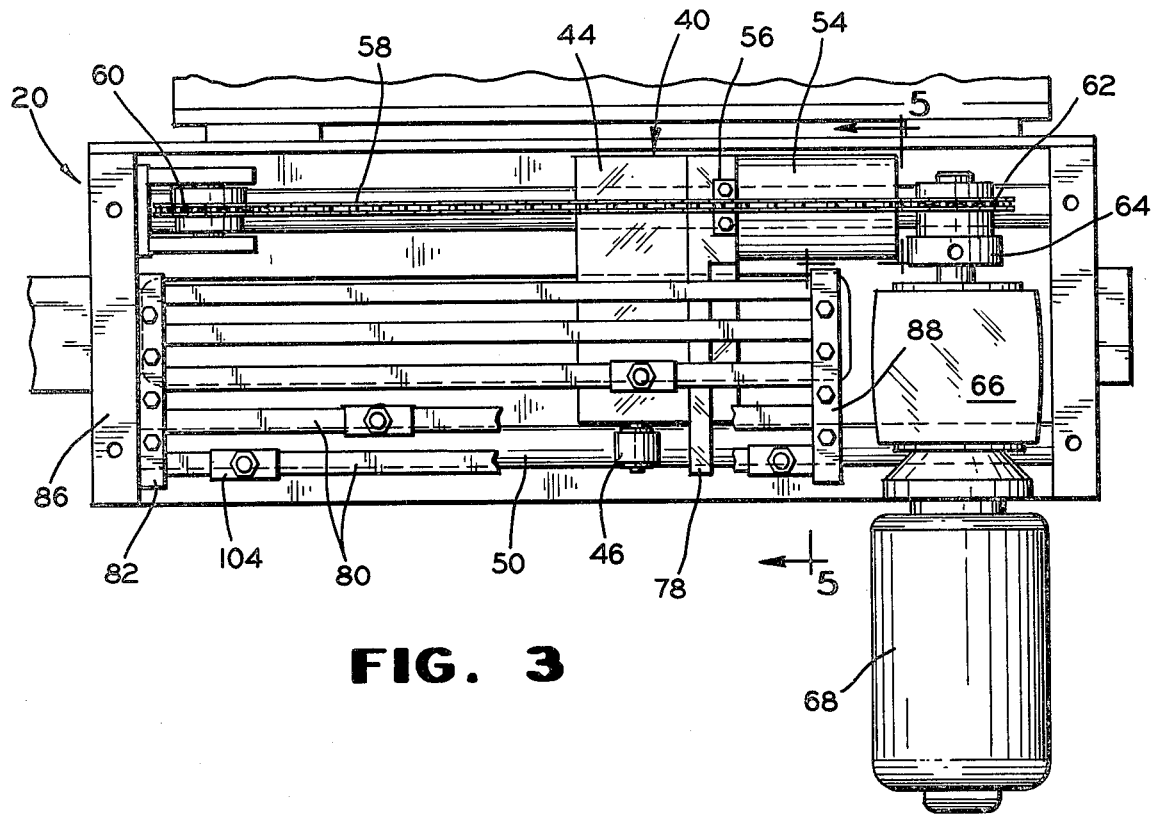
FIG. 3 is a further enlarged, top view of a drive and control housing of the welding machine, with a cover removed.
Figure 7:
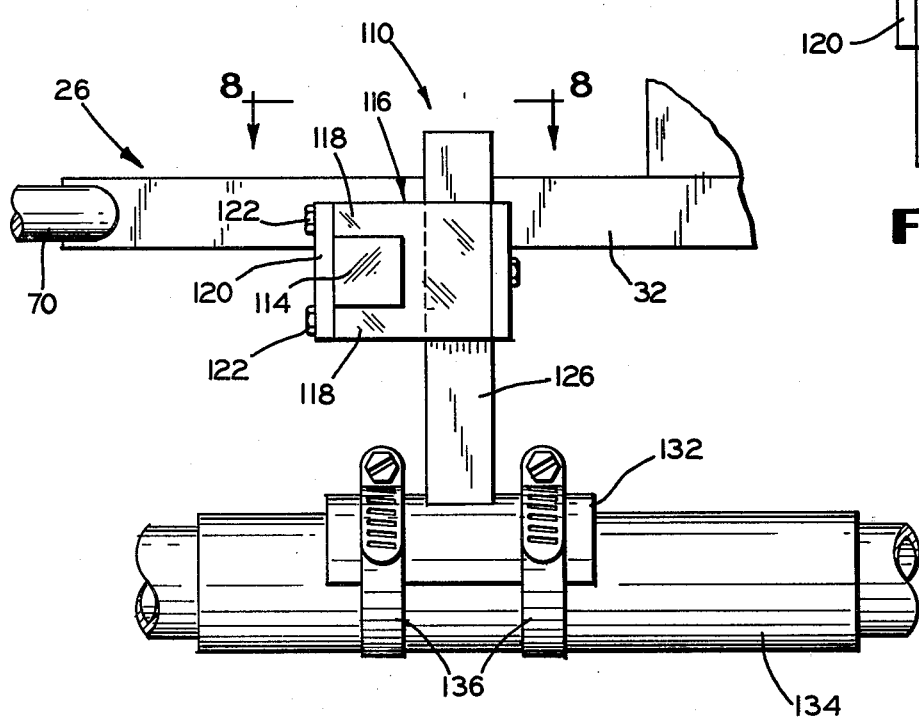
Figure 8:
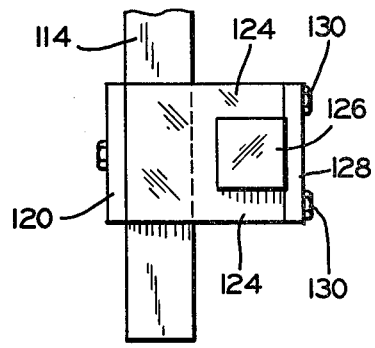

FIG. 7 is a fragmentary, side view in elevation of a portion of a welding tool mounting member of FIGS. 1 and 2, taken along the line 7—7 of FIG. 2; and FIG. 8 is a fragmentary, detailed view taken along the line 8—8 of FIG. 7.

Referring to the drawings, and particularly to FIG. 1, an overall welding machine or apparatus in accordance with the invention is indicated at 10. The machine includes a stand or base 12 carrying a work support or plate 14 on vertical and horizontal frame members 16 and 18. A drive and control housing 20 is mounted on the base 12 by side plates 22 and an electrical junction box 24 is located to one side of the housing 20. A welding tool mounting member 26 is located immediately under the drive and control housing 20 and moves back and forth over the work support 14 in directions toward and away from the housing 20. Two welding tools 28 and 30 are adjustably supported by the mounting member 26, as will be discussed in more detail subsequently. The tools can be of any suitable type, MIG torches, for example.

The mounting member 26 includes a main bar 32 located immediately under a bottom wall 34 of the housing 20 and affixed by fasteners 36 to an extension 38 of a driven member 40 within the drive and control housing. The extension 38 extends through a slot 42 located in the bottom wall 34 of the housing. The driven member 40 includes a main block 44 from which the extension 38 depends. At one side, the block 44 has two rollers 46 and 48 which bear against a guide rod 50 extending longitudinally through the housing 20. At the other side, the main block has a ball bushing 52 extending therefrom and slidably receiving a guide rod 54, the guide rod 54 also extending through a portion of the main block 44. With this arrangement, the driven member 40 is guided for longitudinal movement within the housing 20 in a direction toward and away from the workpiece support 14 and similarly moves the welding tool mounting member 26 longitudinally toward and away from the housing 20 and back and forth over the work support 14. The rollers 46 and 48 with the ball bushing 54 provide the necessary cantilevered support for the mounting member 26 through the extension 38.

Figure 4:
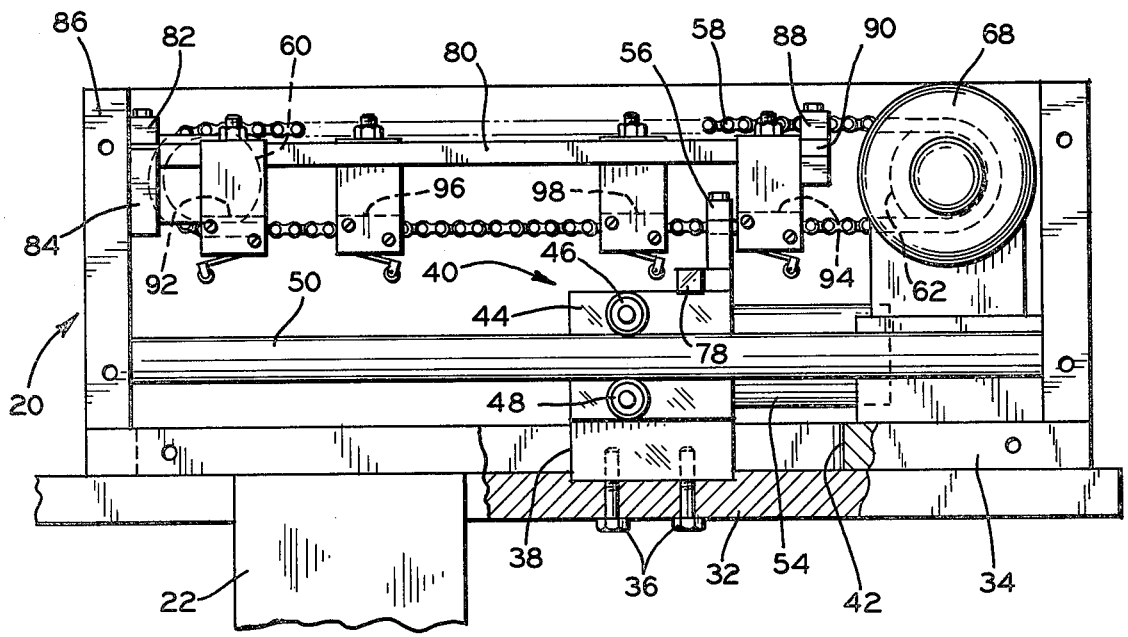
FIG. 4 is a side view in elevation, with parts broken away and with parts in section, of the drive and control housing of FIG. 3, with a side cover removed.

For moving the driven member 40 within the housing 20, the block 44 has an upwardly extending clamp 56 which engages a chain 58. The chain 58 extends around an idler sprocket 60 and a drive sprocket 62. The sprocket 62, in turn, is connected through a slip clutch 64 to a gear reducer unit 66 located within the housing. The unit 66 is connected to a variable speed DC motor 68 mounted on the outside of the housing 20. The motor speed is determined by a commercially-available SCR unit located in the box 24 to set the desired torch speed in inches per minute. The slip clutch 64 has enough tension to enable the motor 68 to drive the sprocket 62 in a counterclockwise direction, as shown in FIG. 4, so as to move the chain 58 in a manner to move the driven member 40 in a direction away from the workpiece support. The slip clutch also enables the torches to be moved back and forth manually.

The bar 32 of the mounting member 26 has a forwardly extending handle 70 (FIGS. 1 and 2) which can be grasped by the operator. The mounting member 26 can than be pulled outwardly away from the housing 20 over the workpiece support 14 to a starting point at a forward end portion of a workpiece indicated at 72. The workpiece, in this instance, is shown as a base plate 74 and a flange 76, with the welding tools 28 and 30 producing weld beads at the junctures of the flange 76 and the base plate 74, on each side of the flange. Rather than the mounting member 26 being manually pulled out, a fluid-operated cylinder can be connected to the member 26 or the driven member 40 to return the member 26 to the starting point.

To control the operation of the machine, the main block 44 of the driven member 40 has an actuating finger or member 78 thereon and extending to one side thereof to operate a plurality of switches. A plurality of switch-mounting bars 80, there being five, in this instance, are supported by clamping blocks 82 and 84 located at a forward end wall 86 of the housing 20 and extend in a cantilevered manner longitudinally toward the rear of the housing 20, where they are affixed to a connecting bar 88.

In this instance, two end limit switches 92 and 94 are mounted on the outer bar 80, a forward, intermediate limit switch 96 is located on the second of the bars 80, and a rearward, intermediate limit switch 98 is mounted on a third one of the bars 80. The limit switches 92–98 are commercially available and are of the one-way type so that they are actuated when the actuating finger 78 moves only in one direction, the feelers otherwise merely pivoting out of the way. When the first limit switch 92 is actuated by the driven member 40 being pulled forward by the handle 70 until the finger actuates this switch, the motor 68 is started to drive the chain 58 and to move the driven member 40 at a controlled rate of speed and in a controlled path as determined by the guide rods 50 and 54 toward the rear of the housing 20. This moves the tools 28 and 30 at a controlled rate and in a controlled path from a forward portion of the workpiece 72, as indicated in dotted lines in FIG. 2, to a rear portion of the workpiece 72, as shown in solid lines in FIG. 2. At this time, the actuating finger 78 contacts the limit switch 94 which stops the motor 68.

As the driven member 40 moves rearwardly from the limit switch 92, the actuating finger 78 actuates the limit switch 96. This actuates a suitable switch and valve in a commercially-available welding unit 100 (FIG. 1) to supply weld wire through the tools 28 and 30 and also to supply shielding gas, if such is used. Uniform weld beads are thus produced on each side of the flange 76 at the surface of the base plate 74. When the finger 78 actuates the limit switch 98, this stops the feed of the weld wire. If shielding gas is used, the switch 98 also actuates a time delay relay which shuts off the shielding gas shortly after the feed wire is stopped.

Figure 5:
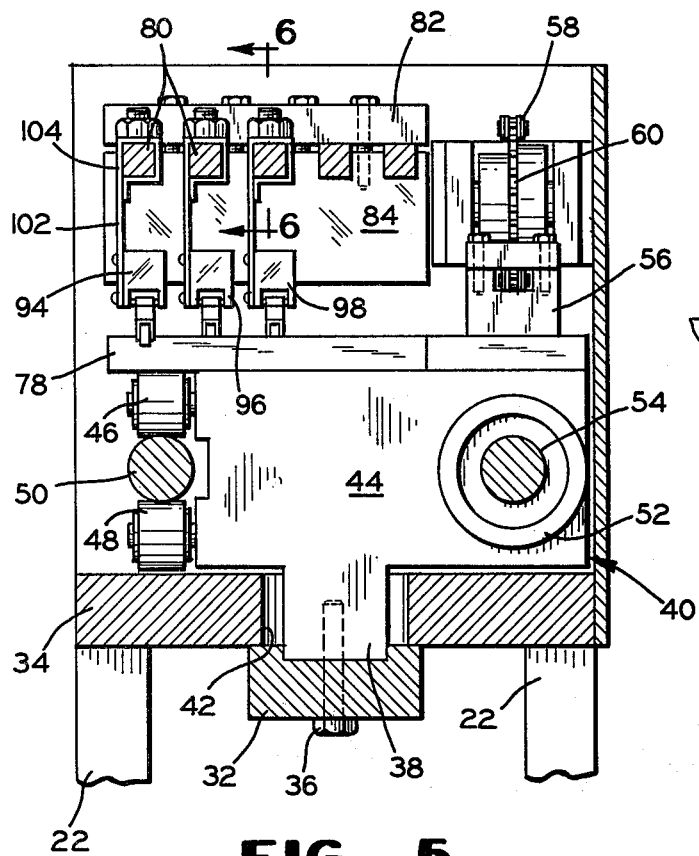
FIG. 5 is a view in transverse cross section taken along the line 5—5 of FIG. 3.
Figure 6:
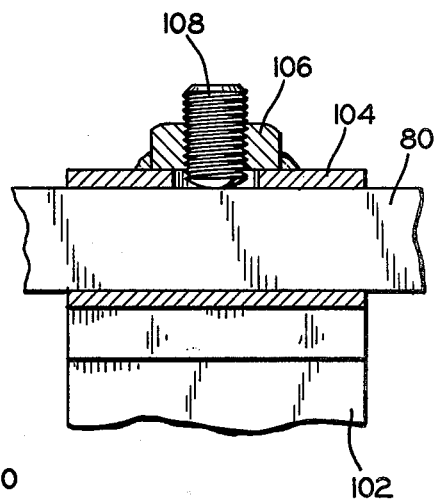
FIG. 6 is an enlarged, detailed view taken along the line 6—6 of FIG. 5.

The limit switches 92–98 can be longitudinally adjusted with respect to the mounting bars 80. This enables the position and length of the overall path of the welding tools 28 and 30 to be controlled and the starting and stopping points for the weld wire feed and any shielding gas to be determined. For this purpose, referring to FIGS. 5 and 6, each of the limit switches is mounted on a bracket 102 having an upper tubular portion 104 extending around the associated bar 80. Nuts 106 are welded to the tubular portions 104 and have set screws 108 extending therethrough to engage the mounting bars and position the brackets and limit switches at the desired locations.

In some instances, it may be desired that the weld bead produced with the welding tool 30 is longer or shorter, or located with different starting and stopping points, than weld bead produced with the tool 28. In that instance, two additional limit switches corresponding to the limit switches 96 and 98, can be located on the fourth and fifth mounting bars 80 and positioned accordingly to control the welding tool 30 independently of the tool 28. Also, in some instances, there may be a large number of each of two different workpieces which are to be welded on the welding machine 10. In that instance, three (or five) additional ones of the mounting bars 80, along with corresponding limit switches, can be employed in the control housing 20 for the additional workpiece. A selector switch can then be used to determine which weld cycle is to be utilized, according to the workpiece to be welded.

Since a variety of workpieces may be welded with the machine 10, the welding tools 28 and 30 must be capable of wide adjustment. In this instance, the tools can be adjusted in or out with respect to the bar 32 and up and down with respect to it. The tools can also be rotated to change the angles of direction. Referring to FIG. 1, the welding tool mounting member 26 has adjustable brackets 110 and 112 at the sides thereof. Both of these are essentially the same. Referring to FIGS. 7 and 8, a transverse tubular supporting bar 114 is affixed to the bar 32 and extends outwardly equally on both sides. A clamping block 116 has legs 118 extending around the tubular bar 114 and has an end plate 120 affixed to the legs by fasteners 122 to clamp the block 116 on the bar 114. Similarly, the block 116 has legs 124 extending around each side of a depending tubular bar 126 with the tube being clamped to the block by an end plate 128 affixed to the legs 124 by fasteners 130. The position of the block 116 on the bars 114 and 126 thus determines the horizontal and vertical positions of the welding tools relative to the mounting bar 32. An arcuate plate 132 is affixed to the lower end of the depending bar 126 with a concave surface facing downwardly. A handle portion 134 of either of the welding torches is then affixed to the arcuate plate 132 by suitable hose type clamps 136. The clamps can be loosened and the torches adjusted to place the nozzles in any desired angular positions.

It will thus be seen from the above that the invention provides a welding machine which is highly adaptable and capable of handling a number of different workpieces requiring welding. As indicated, the machine is also relatively low in cost and simplified in design so as to require minimal maintenance.

Various modifications of the above-described preferred embodiment of the invention will be apparent to those skilled in the art, and it is to understood that such modifications can be made without departing from the scope of the invention, if they are within the spirit and the tenor of the accompanying claims.

I claim:

1. Welding apparatus comprising a base, a workpiece support carried by said base, a drive and control housing on said base near said workpiece support, a welding tool mounting member, a driven member in said drive and control housing and connected to said mounting member, guide means in said drive and control housing engaging said driven member for guiding said driven member in a lineal path toward and away from said workpiece support to move said mounting member in a lineal path between a first position near said drive and control housing and a second position spaced farther from said drive and control housing, drive means engagable with said driven member for moving said mounting member at a selected, uniform speed over said workpiece support and toward said first position from said second position when said drive means is energized, first switch means for energizing said drive means when said mounting member is in the second position, second switch means for deenergizing said drive means when said mounting means is in said first position, and handle means connected to said mounting member to aid in moving said mounting member from said first position to said second position.

2. Welding apparatus according to claim 1 characterized by said drive means comprising a motor having a drive shaft, a one-way clutch mounted on said drive shaft, means connecting said one-way clutch and said driven member, said one-way clutch being engaged when said welding tool mounting member moves toward said first position from said second position, said first switch means energizing said drive means by starting said motor and said second switch means deenergizing said drive means by stopping said motor.

3. Apparatus according to claim 1 characterized by at least one welding tool mounted on said welding tool mounting member, means for feeding welding wire through said tool, and additional switch means in said drive and control housing between said first switch means and said second switch means and engagable by said driven member for stopping and starting the wire feeding means when said drive means is energized.

4. Apparatus according to claim 1 characterized by said drive and control housing having a slot therein extending toward said workpiece support, said welding tool mounting member being located outside said housing adjacent said slot, and said driven member being connected to said mounting member through said slot.

5. Apparatus according to claim 1 characterized by bracket means carried by said welding tool mounting member for adjustably holding two, parallel welding tools for vertical, horizontal, and rotational movement with respect to said mounting member.

6. Welding apparatus for producing beads on a plurality of similar workpieces, said welding apparatus comprising a base, a workpiece support carried by said base, a drive and control housing mounted on said base behind said workpiece support, a driven member in said drive and control housing and having a portion extending outwardly therefrom, a welding tool mounting member connected to said portion of said driven member and located outside said housing, guide means in said drive and control housing engaging said driven member for supporting said driven member and for guiding said driven member in a path toward and away from said mounting member between a first position near said drive and control housing and a second position spaced farther from said drive and control housing, a motor in said drive and control housing having a drive shaft, a one-way clutch mounted on said drive shaft, means connecting said one-way clutch and said driven member, said one-way clutch being engaged when said welding tool mounting member moves toward said drive and control housing, first switch means engagable by said driven member for starting said motor when said mounting member is in the second position, and second switch means for stopping said motor when said mounting member is in the first position.

7. Welding apparatus according to claim 6 characterized by said connecting means comprising a drive sprocket connected with said one-way clutch, an idler sprocket spaced from said drive sprocket, and a chain extending around said sprockets and having a portion connected to said driven member.

8. Welding apparatus according to claim 6 characterized by an infinitely variable speed control unit connected to said motor for providing an infinitely variable, uniform speed for said driven member.

9. Welding apparatus according to claim 6 characterized further by at least one welding tool mounted on said welding tool mounting member, means for feeding wire through said tool, third switch means in said drive and control housing between said first and second switch means for starting said wire feeding means, and fourth switch means in said drive and control housing between said second and third switch means for stopping said wire feeding means.

10. Apparatus according to claim 9 characterized by there being a plurality of bars extending in said drive and control housing parallel to the path of said driven member, said first, second, third, and fourth switch means being adjustably mounted along said bars.

* * * * *